United States Patent
Tan et al.

(10) Patent No.: US 10,539,990 B2
(45) Date of Patent: Jan. 21, 2020

(54) MULTIPLE POWER PATHS IN A MULTI-BATTERY INFORMATION HANDLING SYSTEM

(71) Applicant: Dell Products L.P., Round Rock, TX (US)

(72) Inventors: Geroncio O. Tan, Austin, TX (US); Mohammed Hijazi, Austin, TX (US); Merle J. Wood, III, Round Rock, TX (US); Wei-Cheng Yu, New Taipei (TW); Tsung-Cheng Liao, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/669,398

(22) Filed: Aug. 4, 2017

(65) Prior Publication Data
US 2019/0041934 A1    Feb. 7, 2019

(51) Int. Cl.
*G06F 1/26* (2006.01)
*G06F 1/16* (2006.01)

(52) U.S. Cl.
CPC ............ *G06F 1/263* (2013.01); *G06F 1/1626* (2013.01); *G06F 1/1632* (2013.01); *G06F 1/1635* (2013.01); *G06F 1/1637* (2013.01); *G06F 1/266* (2013.01)

(58) Field of Classification Search
CPC ...... G06F 1/263; G06F 1/1626; G06F 1/1635; G06F 1/266; G06F 1/1637
See application file for complete search history.

(56) References Cited

U.S. PATENT DOCUMENTS

| | | | | |
|---|---|---|---|---|
| 2001/0052758 A1* | 12/2001 | Odaohhara | ............. | G06F 1/263 320/103 |
| 2004/0210406 A1* | 10/2004 | Bui | ......................... | G06F 1/263 702/63 |
| 2007/0120525 A1* | 5/2007 | Tsuji | ..................... | G06F 1/1616 320/110 |
| 2007/0285056 A1* | 12/2007 | Yoon | ...................... | G06F 1/263 320/116 |
| 2012/0322431 A1* | 12/2012 | Kil | ........................... | H02J 9/06 455/418 |
| 2016/0126757 A1* | 5/2016 | Hirosawa | .............. | G06F 1/1632 307/20 |
| 2018/0120915 A1* | 5/2018 | Li | ........................... | G06F 1/324 |

* cited by examiner

*Primary Examiner* — Jaweed A Abbaszadeh
*Assistant Examiner* — Gayathri Sampath
(74) *Attorney, Agent, or Firm* — Norton Rose Fulbright US LLP

(57) ABSTRACT

An information handling system may have multiple batteries and be powered by any one or combination of those batteries. The multiple batteries may be in different detachable portions of the system. When the portions are attached, a battery in one unit connects through multiple input paths to provide power to the other unit. Under a heavy loading condition, power may be drawn from a first battery while power from a second battery is routed to an external power input of the information handling system to supplement power drawn from the first battery.

16 Claims, 5 Drawing Sheets

MULTIPLE POWER PATHS IN A MULTI-BATTERY INFORMATION HANDLING SYSTEM

FIELD OF THE DISCLOSURE

The instant disclosure relates to information handling systems. More specifically, portions of this disclosure relate to power routing in multi-battery information handling systems.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be designed with two-in-one functionality incorporating features of both tablets and laptops. Two-in-one systems may include a detachable tablet unit with a display, such as a capacitive or resistive touch display, and a detachable base unit with an integrated input device such as a keyboard and/or a trackpad. The tablet unit may function as a standalone tablet device. Such functionality, however, may require that many information handling system components be housed within the tablet unit. Such components, such as processors, memory, speakers, and other information handling system components, take up space and consume power.

Design of portable information handling systems with two-in-one functionality can require compromise among competing concerns such as processing capabilities, power consumption, battery life, and size. Battery capacity is generally proportional to a physical size of the battery. Thus, components in the tablet unit take up space that would otherwise house battery capacity. Furthermore, the tablet unit may include higher performance components than conventional tablets, which can require greater power capacity than low performance components. Thus, the tablet unit may be limited in functionality by battery capacity in view of its high-performance components and reduced space for the battery.

Shortcomings mentioned here are only representative and are included simply to highlight that a need exists for improved information handling systems, particularly for dual-power path dual-battery information handling systems. Embodiments described herein address certain shortcomings but not necessarily each and every one described here or known in the art. Furthermore, embodiments described herein may present other benefits than, and be used in other applications than, those of the shortcomings described above.

SUMMARY

A multi-battery information handling system with multiple power routing paths between batteries and system components can provide for enhanced power draw capacity when operating from battery power. For example, a battery of a base unit of a portable two-in-one information handling system can provide power to a tablet unit of the system either through a battery connection terminal of the tablet unit or through an external power input terminal of the tablet unit. When power from the base battery is provided through the external power input terminal, it can supplement power being drawn from a tablet battery to provide an enhanced power draw capacity greater than the capacity available from either the tablet battery or the base battery alone.

Power demands of multi-battery information handling systems may exceed power draw capacity of a single battery due to, for example, a heavy performance load placed on system components or high-power demands of peripheral components connected to the system. For example, a two-in-one information handling system may contain a battery in a tablet unit and a battery in a base unit and may power one or both of the units either with power from the base battery or power from the tablet battery. One way to address insufficient battery power capacity is to throttle performance of components consuming high levels of power or to disable connection to peripheral devices requiring power when operating from battery power. However, throttling or disabling functionality can have a negative impact on user experience. By providing an alternative path from the battery of the base unit to the tablet unit, the battery of the base unit may be used to supplement power draw capacity of the battery of the tablet unit. Thus, the maximum power draw capacity of the information handling system can be increased beyond a maximum power draw capacity of either the base battery or the tablet battery alone.

To take advantage of multiple power routing paths, an information handling system may be equipped to detect the presence of a condition where supplemental power draw capacity may be advantageous. For example, a heavy loading condition of the information handling system may be detected. The heavy loading condition may occur when a power requirement of the system, such power required by system components and external peripherals, is greater than a power draw capacity of either a first battery or a second battery alone. When such a condition is detected, the information handling system may draw power from tablet unit battery and power from a base unit battery. The base unit power may be routed to an external power input terminal, such as an external power input terminal of the tablet unit of the information handling system, to supplement power drawn from the first battery. The external power input terminal may be external to a voltage domain of the first battery, but within the information handling system. For example, the external power input terminal may be an input of a charger of the information handling system which may adjust a voltage and/or current of power received from the second battery before supplying the power to a voltage domain of the first battery, such as one or more busses to which unadjusted power may be provided from the first battery. Thus, a separation between unadjusted power from the first battery and unadjusted power from the second battery may be maintained. When the second battery is used to supplement power drawn from the first battery, the two batteries together may have a greater power draw capacity than either battery individually, allowing the information handling system to provide additional functionality. The power routed from the second battery may be used to charge the first battery, in addition to supplementing power drawn from the first battery to power the information handling system.

An end of the heavy loading condition may also be detected and the battery connections reconfigured for a lower power load. When the end of the heavy loading condition is detected, power from the base unit battery may be rerouted from the external power input terminal to a battery input terminal of the information handling system. Then, power from the tablet unit battery may be disconnected. Alternatively, power from the second battery may be disconnected, and the information handling system may continue to receive power from the first battery.

An information handling system, such as a two-in-one portable information handling system, may include a first unit, such as a tablet unit, and a second unit, such as a base unit. The information handling system may also include a controller. For example, a single controller may be housed within the tablet unit or the base unit, or the tablet unit and base unit may house separate controllers. The first unit may include a display, a first external power input terminal, a first battery, and a first external power input terminal. The second unit may include an input device, and a second battery. The controller may control one or more components of the information handling system to perform the steps described herein, although in some embodiments the control may be accomplished with a single controller in either the first unit or the second unit. The first external power input terminal may include an input of a narrow voltage direct current charger (NVDC). The NVDC may manage the power received from the second battery through the external power input terminal to supplement power received from the first battery in powering the information handling system.

A base unit of an information handling system may be configured with switches and a controller to control the supply of power to or the receipt of power from a tablet unit. The base unit may include an input device, a second battery, a first power terminal configured to connect the base to an external power input terminal of the tablet unit, a second power terminal configured to connect the base to a battery power terminal of the tablet unit, a first switch connected between the second battery and the first power terminal, a second switch connected between the second battery and the second power terminal, and a controller configured to control the first switch and the second switch.

The controller of the base unit may control the first and second switches to perform methods described herein. For example, the controller may control the first and second switches to supply power from the second battery to the tablet unit through either the first power terminal or the second power terminal. The information handling system may require a greater power draw capacity than either the first battery in the tablet unit or the second battery in the base unit is able to provide. To provide additional power draw capacity, the controller may control the first switch to deliver power from the second battery through the first power terminal to the tablet unit to supplement power drawn from the first battery in the tablet unit. Alternatively, a controller in a tablet unit may control the switches of the base unit, individually or in communication with the controller of the base unit.

Information handling systems may require consistent power. Furthermore, batteries of multi-battery information handling systems may have divergent voltages and cross-conduction between the batteries may cause damage. When transitioning from supplying power to the system from the second battery, the battery of the base unit, to supplying power to the system from the first battery, the battery of the tablet unit, power loss may occur if both batteries are disconnected at the same time. To prevent power loss during a transition, the second switch may allow current to flow through the second switch, during the transition, to power the system, if a voltage of the second battery is greater than a voltage of the first battery. For example, the first and second switches may each include a first Field Effect Transistor (FET) and a second FET, with a bypass diode connected in parallel to the first FET. Alternatively, the bypass diode may be omitted and current may be passed through a body diode of the first FET. The tablet unit may also have a similar switch for connecting its battery to components of the information handling system. When transitioning from powering from the second battery of the base unit to the first battery of the tablet unit, the first FET of the second switch may be deactivated first. The diode may allow current to bypass the first FET of the second switch if the battery of the base has a voltage greater than the battery of the tablet unit. If no diode is present, current may flow through a body diode of the first FET of the second switch, if the battery of the base has a voltage greater than the battery of the tablet unit. Likewise, a second FET of the switch connecting the battery of the display unit to the information handling system may be activated, allowing current to flow through the diode bypassing the second FET of the switch, if the voltage of the battery of the tablet unit is greater than the voltage of the battery of the base unit. Then, the second FET of the second switch may also be deactivated, blocking all power from the base battery. Thus, power will flow exclusively through the bypass diode, or, if there is no bypass diode, through a body diode of the first FET, of the switch connecting the tablet battery to the information handling system. Then, the first FET of the switch connecting the tablet battery to the information handling system may activate, allowing power to flow freely through the first and second FETs of the switch connecting the tablet battery to the information handling system. Thus, power delivery to the information handling system may continue uninterrupted during a transition from powering the information handling system with a battery of the base unit to powering the information handling system with a battery of the tablet unit.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
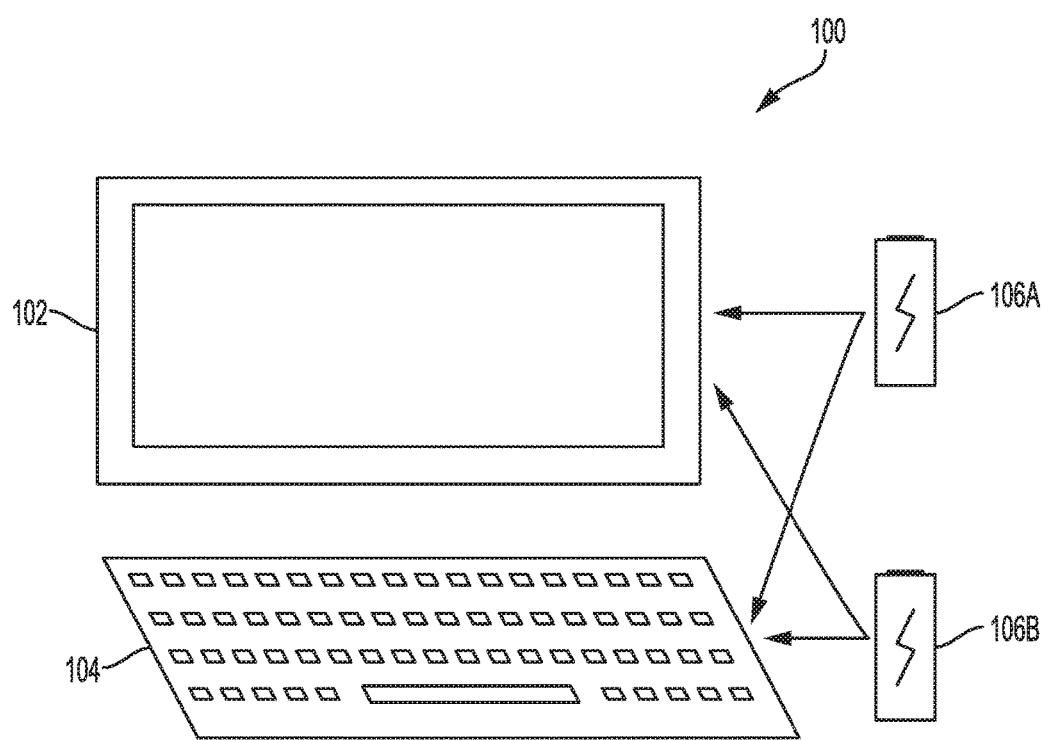
FIG. 1 is an illustration of a portable two-in-one information handling system according to some embodiments of the disclosure.

Two-in-one portable information handling systems can incorporate many of the features of both tablets and laptop devices in one device. For example, a two-in-one portable information handling system 100, as illustrated in FIG. 1, may include a tablet unit 102 and a base unit 104. The tablet unit 102 may be detached and used separately from the base unit 104. The tablet unit 102 may include a capacitive or resistive touch display, speakers, one or more external memory readers, one or more ports, such as a USB port, one or more external charging interfaces, one or more processors, memory, a wireless network radio, a Bluetooth radio, a battery, a discrete graphics processing unit, one or more cooling elements such as fans, and other information handling system components. The tablet unit 102 may operate as a standalone tablet device when not connected to the base unit 104. The base unit 104 may include one or more input devices, such as a track pad or a keyboard, and may also include additional components. For example, when the tablet unit 102 is connected to the base unit 104, the input device may be used to manipulate information displayed on the display of the tablet unit. Furthermore, a second battery 106B, of the base unit, may be used to supplement a first battery 106A, of the tablet unit. For example, when the tablet unit 102 is disconnected from the base unit 104, the first battery 106A may power the tablet unit. When the tablet unit 102 is connected to the base unit 104, the tablet unit 102 and the base unit 104 may each be powered either from the first battery 106A, the second battery 106B, or both the first and second batteries 106A-B concurrently.

A maximum continuous discharge current of a battery in a portable two-in-one information handling system, such as first battery 106A or second battery 106B, may be limited due to space and weight constraints in incorporating the battery into the tablet unit 102 or the base unit 104 of the system 100. For example, the maximum discharge capacity, for example the maximum continuous discharge current, of each of the first battery 106A and the second battery 106B may be limited to 1 Coulomb (C) or another maximum continuous discharge current. The information handling system 100 may have a total system power demand greater than the maximum continuous discharge current of either the first battery 106A or the second battery 106B alone. For example, the system 100 may have a maximum power demand of 51.5 W or 1.3 C, exceeding the 1 C maximum discharge capacity of either the first battery 106A or the second battery 106B. Furthermore, components such as a discrete graphics card may be housed in the base unit 104, further increasing power demands on the batteries of the system. To avoid throttling performance, power drawn from the first battery 106A may be supplemented with power drawn from the second battery 106B. Multiple batteries 106A-B within the system 100 may have different voltages and power characteristics, however, and thus power drawn from the second battery 106B may require adjustment before being combined with power drawn from the first battery 106A. Therefore, in addition to a battery power path to transmit power from the first battery 106A to the base unit 104 and from the second battery 106B to the tablet unit 102, a second power path may be implemented in the information handling system 100 to transmit power from the second battery 106B to an external alternating current (AC) input of the information handling system 100 to allow power from the second battery 106B to be adjusted before supplementing power drawn from the first battery 106A.

Figure 2:
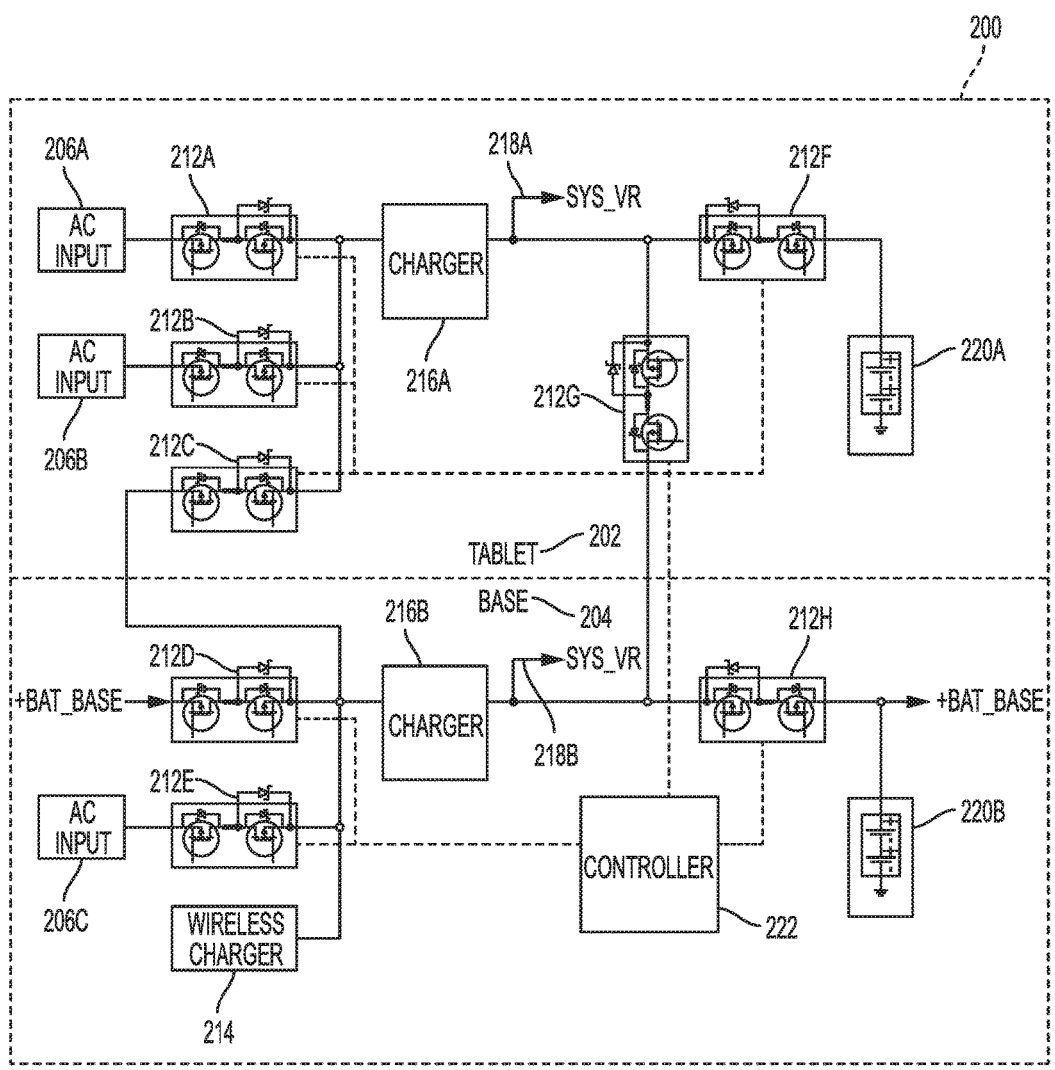
FIG. 2 is a circuit schematic illustrating a power system of a portable two-in-one information handling system according to some embodiments of the disclosure.

A two-in-one portable information handling system with a battery in a tablet unit and a battery in a base unit may use switches to allow the information handling system to selectively operate from multiple power sources, such as batteries or external alternating current (AC) power sources. Example power circuitry of an information handling system 200 is illustrated in FIG. 2. A two-in-one portable information handling system 200 may be divided into a tablet unit 202 and a base unit 204, each capable of providing power to itself and the other unit. The tablet unit 202 may include one or more AC inputs such as first tablet AC input 206A and second tablet AC input 206B, which may be a barrel connector and a USB Type-C connector. For example, the information handling system may receive power through the first tablet AC input 206A to power the tablet unit 202, to power the base unit 204, to charge a first battery 220A of the tablet unit 202, and/or to charge a second battery 220B of the base unit 204. Switches 212A-B may selectively connect the AC inputs 206A-B, respectively, to an input of a charger 216A, such as a narrow voltage direct current charger (NVDC), to power the units 202, 204 and/or to charge the batteries 220A-B. A third switch 212C may connect the second battery 220B, of the base unit 204, to the input of the charger 216A, such as to provide additional power draw capacity for the information handling system 200. The input of charger 216A may be an external power input terminal. For example, a connector for connecting the tablet unit 202 to the base unit 204 may be connected between the base unit 204 and the input of the charger 216A and may be an external power input terminal of the tablet unit 202. The power draw capacity of the system 200 may be the sum of a maximum discharge current of each of batteries 220A-B providing power to the information handling system 200. The charger 216A may be a buck or boost NVDC charger and may allow the power drawn from the second battery 220B, of the base unit 204, to be used as an AC source to charge the first battery 220A, of the display unit 202, and to power both the tablet unit 202 and the base unit 204. Alternatively, an external boost circuit may be used to adjust the voltage level of the power received from the second battery 220B.

Once the power received from external AC inputs or from the second battery 220B has been adjusted by the charger 216A, it may be delivered to system components of both the tablet unit 202 and the base unit 204. For example, the output of the charger 216A may be connected to an input of a system voltage regulator 218A of the tablet unit 202, to provide power to system components housed in the tablet unit 202 such as a display, memory, a processor, speakers, and other system components. A unit connector switch 212G may connect the output of the charger 216A and the base unit 204 to the input of the system voltage regulator 218A to provide power to or receive power from the base unit 204. The voltage regulator 218A may transfer the received power to system components such as fans, processors, memory, radios, and other peripheral components. For example, the unit connector switch 212G can be used to provide power from the base battery 220B to the tablet unit 202, when the tablet unit 202 is not being powered by an external AC power source or by the tablet battery 220A. A terminal of the unit connector switch 212G connected to the base unit 204 may be a battery input terminal. For example, a connector for connecting the tablet unit 202 to the base unit 204 may be connected between unit connector switch 212G and the base unit 204, and may be a battery input terminal of the tablet unit 202. The unit connector switch 212G can also be used to provide power from the tablet battery 220A or from an AC power source connected to the tablet unit 202 to the base unit 204 to power the base unit 204 and/or to charge the base battery 220B. A battery switch 212F may connect the output of the charger 216A, the input of the system voltage regulator 218A, and the unit connector switch 212G to the battery 220A. When connected, power from the tablet battery 220A, or power received from the base unit 204 through unit connector switch 212G can be used to power the tablet unit 202 through system voltage regulator 218A. Power from external AC inputs 206A-B or power received from the base unit 204 through switch 212C can also be used to power the system through system voltage regulator 218A, alone or in combination with power drawn from the tablet battery 220A. Switches 212A-C and 212F-G, or individual components of switches 212A-C and 212G-F, may be individually controlled by a controller 224 of the tablet unit 202 to route power within the information handling system 200.

The base unit 204 may also include a battery 220B capable of providing power to both the base unit 204 and the tablet unit 202. The base unit 204 may include an AC input 206C for receiving power from an external AC source, and/or a wireless charger 214 for receiving wireless power, to power the base unit 204, the tablet unit 202, and/or to charge the batteries 220A-B of the information handling system. The AC input 206C may be connected to an input of a charger 216B, such as a buck or boost NVDC charger, of the base unit 204 via a switch 212E. The wireless charger 214 may be directly connected to an input of the charger 216B. An output of the charger 216B may be connected to an input of a system voltage regulator 218B of the base and switch 212G of the tablet unit 202. A battery switch 212H may connect the base battery 220B to the output of the charger 216B, the input of the system voltage regulator 218B, and switch 212G of the tablet unit 202. A connector connected between battery switch 212H and the tablet unit 202 may be a second power terminal for connecting the base unit 204 to a battery input terminal of the tablet unit 202. For example, the tablet unit 202 and the base unit 204 may have corresponding physical connectors between battery switch 212H and switch 212G for connecting the base battery 220B to a battery path of the tablet unit 202 and for connecting the tablet battery 220A to the base unit 204. The physical connectors (not shown) may be in a latching mechanism that attaches the tablet unit 202 to the base unit 204. The base battery 220B may be further connected to switch 212C of the tablet unit 202 via a second battery switch 212D. A connector between second battery switch 212D and the tablet unit 202 may be a first power terminal for connecting the base unit to an external power input terminal of the tablet unit 202. The second battery switch 212D may be connected to the input of the charger 216B of the base unit 204. For example, the tablet unit 202 and the base unit 204 may have corresponding connectors between second battery switch 212D and the input of the charger 216A for connecting the base battery 220B to the external power input terminal of the tablet unit 202.

The configuration of switches in the base unit 204 may route power in various ways through the information handling system 200. For example, power received through AC input 206C or through the wireless charger 214 of the base unit 204 may be routed to an input of the charger 216A of the tablet unit 202 through switch 212C. Alternatively or additionally, power received through AC input 206C or through the wireless charger 214 of the base unit 204 may be adjusted by charger 216B and delivered to system voltage regulator 218B, used to charge battery 220B, and/or provided through unit connect switch 212G to the tablet unit 202 to power the tablet unit through system voltage regulator 218A and/or to charge tablet battery 220A. Power from the base battery 220B may be delivered to the tablet unit 202 through switches 212H and 212G, in a battery input path, to power the tablet unit 202 through system voltage regulator 218A. Power from the base battery 220B may alternatively be delivered to the input of charger 216A through switches 212D and 212C, in an external power input path, to supplement power drawn from battery 220A. Although referred to as an external power input path, the path may not be external to the information handling system, but rather is at least external to a voltage domain on the battery 220A side of the charger 216A. When power is routed from the base battery 220B to the tablet unit 202 via the power input path through switches 212C-D, it may provide an enhanced maximum power draw capacity of the information handling system 200. This allows the system 200 to draw power from both the tablet battery 220A and the base battery 220B simultaneously, at a greater rate than would be possible if simply operating from the tablet battery 220A or the base battery 220B alone. Switches 212H and 212F will generally not allow the batteries 220A and 220B to be connected simultaneously to the system voltage regulator 218A to prevent problems that exist when the batteries 220A and 220B have different output voltages.

Switches 212D-E and 212H, or individual components of switches 212D-E and 212H, may be controlled individually by a controller 222 of the base unit 204 to route power within the information handling system 200. The controller 222 of the base unit 204 may also control switches 212A-C and switches 212F-G of the tablet unit 202. Alternatively, a controller 224 may be housed in the tablet unit 202 and may control switches 212A-H. The controller 222, 224, whether housed in the tablet unit 202 or the base unit 204, may monitor charge levels of batteries 220A-B and determine when to switch between the first tablet battery 220A and the base battery 220B based, in part, on the monitored charge levels. In another embodiment, both the tablet unit 202 and the base unit 204 may include controllers 222, 224. The controllers 222, 224 may communicate with each other to coordinate power routing between the two units 202, 204. In such embodiments, the controller 224 of the tablet unit 202 may control switches 212A-C and 212F-G while the controller 222 of the base unit 204 may control switches 212D-E and 212H.

Portable two-in-one information handling systems, and in particular high-performance systems, may occasionally be placed under power loads greater than allowed for by a power capacity of a single battery. In such systems, it may be advantageous to supplement power drawn from a first battery, for example a battery of a tablet unit of the information handling system, with power from a second battery, for example a battery of a base unit of the information handling system, to avoid throttling system performance. A method 300 for supplementing power drawn from a first battery with power from a second battery may begin with detecting a heavy loading condition on the information handling system, at step 302. For example, a heavy loading condition may be caused by executing a processing and/or memory intensive application, for example an application requiring use of a discrete graphics processing unit on the information handling system, requiring additional power for computing and cooling components. A heavy loading condition may also occur when peripherals are connected to the information handling system that are powered by the information handling system, such as through the USB Type-C Power Delivery standard. A heavy loading condition may be detected when a power demand of the system exceeds a heavy loading threshold, such as a maximum power draw capacity of the battery from which the system is being powered. Alternatively, a threshold for detecting a heavy loading condition may be set based on a threshold power draw level based on the capacity of the battery from which the system is being powered.

When a heavy loading condition is detected, steps may be taken to provide additional power draw capacity to the information handling system. At step 304, power may be drawn from a first battery to power the information handling system, such as from a tablet battery. If power was being drawn from a battery of the base unit prior to the detection of the heavy loading condition, power from the base battery may be disconnected, and the information handling system may begin to draw power from a tablet battery of the information handling system. For example, with reference to FIG. 2, if power was being drawn from base battery 220B through switches 212G-H to power the tablet unit 202 and the base unit 204, and a heavy loading condition of the information handling system was detected, switch 212H may open, disconnecting power from battery 220B, while switch 212F may close, allowing power to be delivered from tablet battery 220A to the tablet system voltage regulator 218A and the base system voltage regulator 218B. If the system 200 was already drawing power from the tablet battery 220A, the system 200 may simply continue to do so without opening or closing any switches.

In order to supplement power drawn from the first battery, power from a second battery may be routed to an external power input terminal of the information handling system to supplement power drawn from the first battery, at step 306. For example, power from the second battery may be routed to an external power input terminal of a tablet unit, to supplement power drawn from a tablet battery of the information handling system. With reference to FIG. 2, the system may be drawing power from the tablet battery 220A through switches 212F-G. To supplement the power drawn from the tablet battery 220A, switches 212D and 212C may close to route power from the base battery 220B to an external power input terminal of the information handling system, such as the input of the tablet charger 216A. Tablet charger 216A may then adjust the power received from the base battery 220B to supplement power drawn from the tablet battery 220A. Power from the base battery 220B, adjusted by the tablet charger 216A, may also be used to charge the tablet battery 220A.

Figure 4:
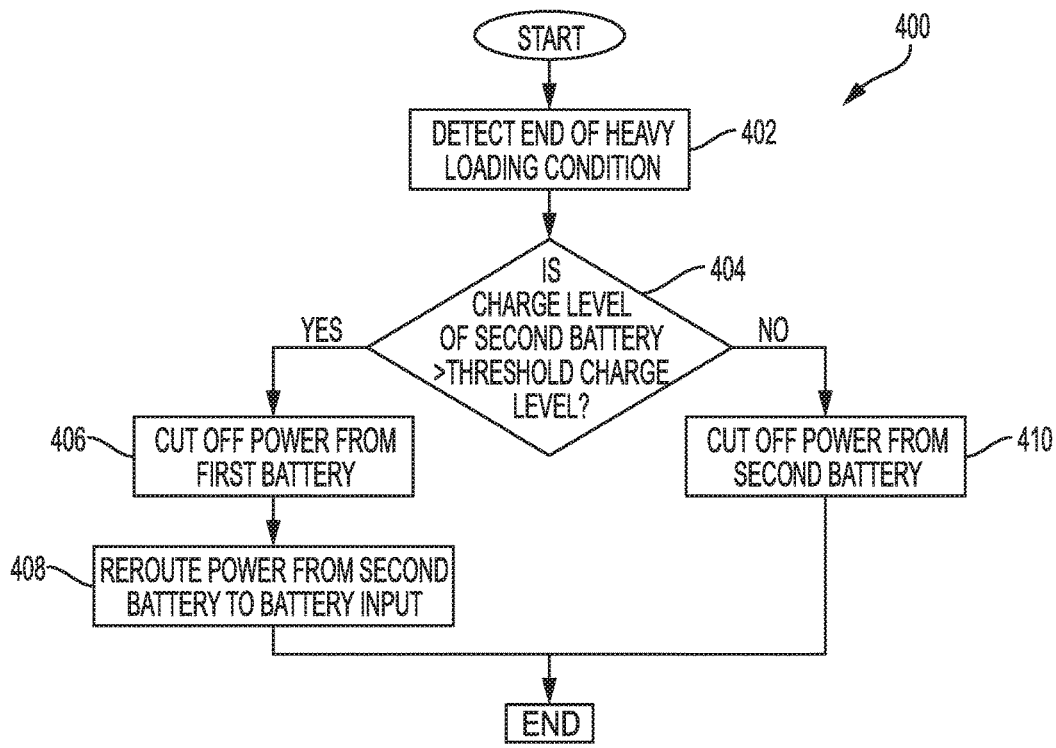
FIG. 4 is an example method for disconnecting power from the second battery when a heavy loading condition is no longer detected in an information handling system according to some embodiments of the disclosure.

After the heavy loading condition ends, power from a base battery may be disconnected from the external power input terminal and may, optionally, be rerouted to a battery input path of the tablet unit. An example method 400 for adjusting a power path for power from a second battery of an information handling system upon ending of a heavy loading condition is illustrated in FIG. 4. At step 402, an end of the heavy loading condition may be detected. For example, the information handling system may detect that a power demand of the system has fallen below a heavy loading threshold, such as an absolute maximum or maximum efficient individual power draw capacity of one or more batteries. For example, a heavy loading condition may end when peripherals requiring power are detached from the information handling system or turned off, or when the processing and/or memory intensive application ceases to run, or the discrete video processor is no longer active.

When an end of a heavy loading condition is detected the information handling system may disconnect power from the second battery, such as the base battery. Alternatively, the information handling system may disconnect the first battery, such as the tablet battery, and reroute power from the second battery to power the information handling system through a battery input path. A determination of whether to disconnect or to reroute power from the second battery may be made based on whether the charge level of the second battery is greater than a threshold charge level, at step 404. The threshold charge level may be a charge level required to power the tablet and base units of the information handling system for a predetermined amount of time, such as ten minutes, thirty minutes, or an hour.

If the charge level of the second battery is determined to be greater than the threshold charge level, power from the first battery, such as the tablet battery, may be disconnected at step 406. Power from the second battery may be rerouted to a battery input of the information handling system, at step 408. With reference to FIG. 2, the base battery 220B may deliver power to an external power input terminal, such as the input of charger 216A via a power routing path through switches 212C-D, when the information handling system 200 is under a heavy loading condition. When such a condition ends, power from the tablet battery 220A may be disconnected by opening switch 212F. Power from the base battery 220B may then be rerouted to the battery input path through switches 212G-H by opening switches 212C-D and closing switch 212H. Switch 212G must also be closed for the tablet unit 202 to draw power from the base battery 220B.

If the charge level of the second battery is determined to be less than the threshold charge level, at step 404, power from the second battery may be disconnected, at step 410. The information handling system may continue to draw power from the first battery. With reference to FIG. 2, the base battery 220B may deliver power to an external power input terminal, such as the input of charger 216A via a power routing path through switches 212C-D, when the information handling system 200 is under a heavy loading condition. When such a condition ends, power from the base battery 220A may be disconnected by opening switches 212C-D. Then, both the base unit 204 and the tablet unit 202 may continue to draw power from the tablet battery 220A. Thus, the information handling system can continue to operate by drawing power from a first battery or a second battery after a heavy loading condition has ended.

Figure 5:
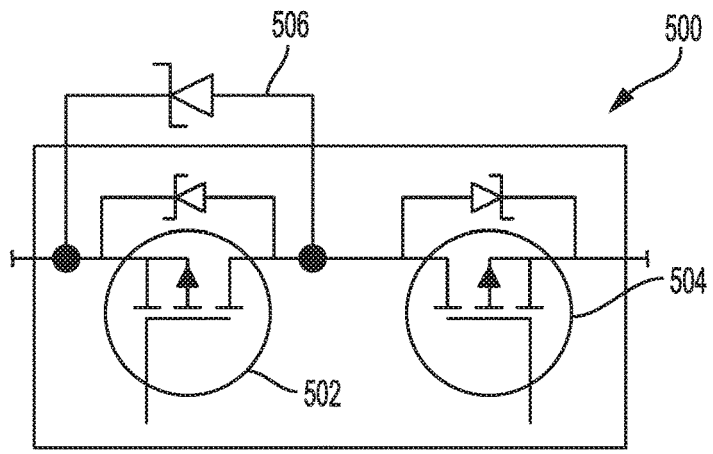
FIG. 5 is a circuit schematic illustrating an example switch for routing power in an information handling system according to some embodiments of the disclosure.

Switches, such as switches 212A-H, may allow power to flow through, when transitioning between a closed state and an open state, under certain conditions. A switch 500, as illustrated in FIG. 5, may include a first transistor 502, a second transistor 504, and a bypass diode 506. The first and second transistors 502, 504 may be field-effect transistors (FETs), such as metal-oxide-semiconductor FETs (MOSFETs), or other kinds of transistors. The bypass diode 506 may be connected in parallel to the first transistor 502 to allow power to bypass the first transistor 502, even when the first transistor 502 is in a non-conducting state, under certain circumstances. The bypass diode 506 may be a Schottky diode. Alternatively, the bypass diode 506 may not be included and an internal body diode of the first transistor 502 may be used to allow power to bypass the first transistor 502 under certain circumstances. The activation/deactivation of the first and second transistors 502, 504 of each of switches 202A-H may be individually controlled by one or more controllers of the information handling system. For example, a controller in a tablet unit may individually control all transistors of all switches in the tablet unit while a controller in a base unit may individually control all transistors of all switches in the base unit.

Figure 6:
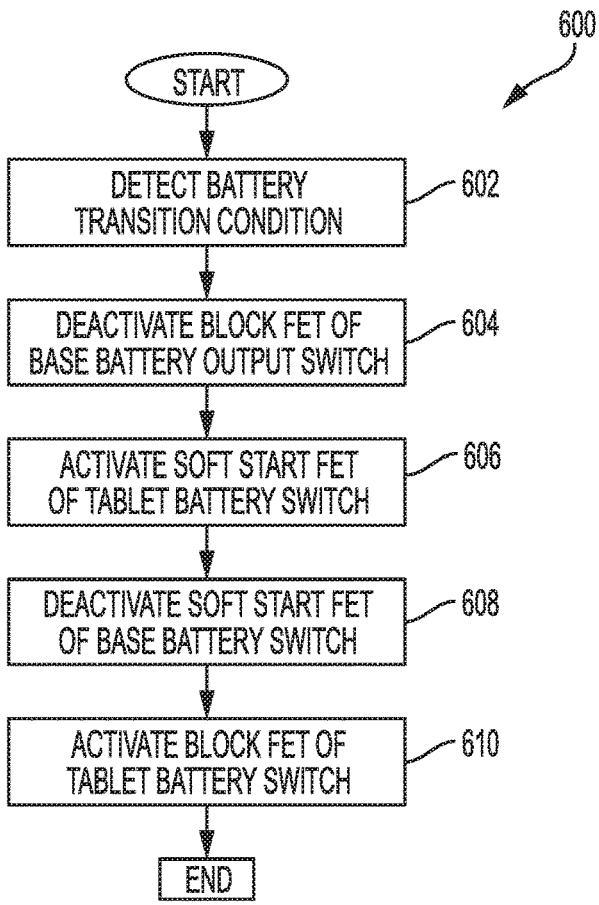
FIG. 6 is an example method for maintaining power delivery to an information handling system during a transition from powering the information handling system with a first battery to powering it with a second battery according to some embodiments of the disclosure.
Figure 7:
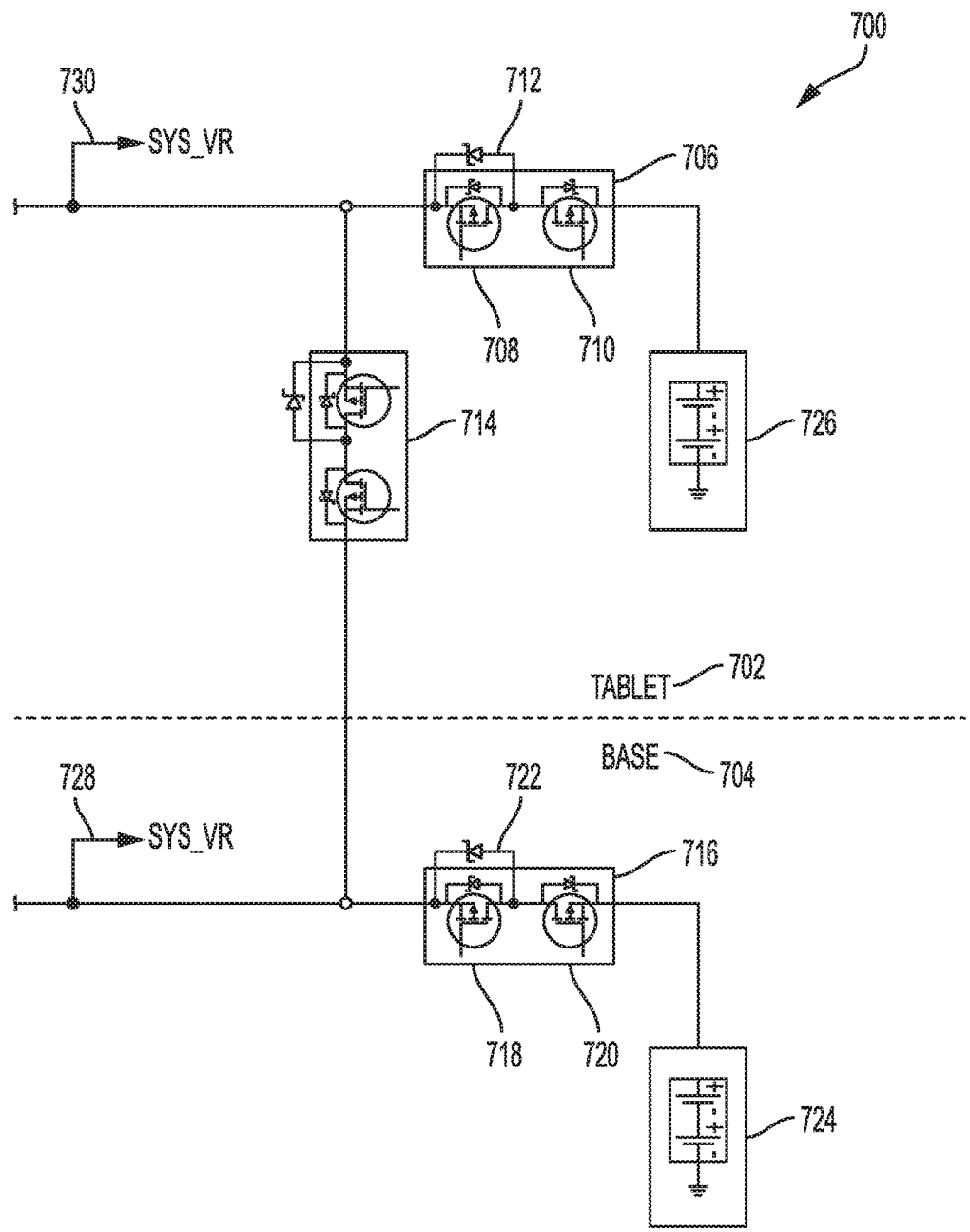
FIG. 7 is a circuit schematic illustrating an example power routing path for powering an information handling system from first and second batteries according to some embodiments of the disclosure.

Switches of a two-in-one portable information handling system may allow power to be transmitted, under certain circumstances, when transitioning the system from being powered by a first battery, such as a tablet battery to being powered by a second battery, such as a base battery, or when transitioning power of a base battery from being transmitted via an external power input path of the information handling system to being transmitted via a battery input path. An example method 600 for maintaining uninterrupted power while transitioning from powering the system with a first battery to powering the system with a second battery is illustrated in FIG. 6. The method illustrated in FIG. 6 may be performed in an information handling system, such as the system 700 illustrated in FIG. 7. The method may begin at step 602 with detection of a battery transition condition. For example, it may be detected that a charge level of the base battery, such as base battery 724 of the system 700, has fallen below a threshold charge level.

When such a condition is detected, the system may begin the transition to drawing power from a different battery, such as tablet battery 726. At step 604, the system may deactivate a block FET of a base battery output switch. For example, a controller of the base unit 704 may deactivate block FET 718 of switch 716. Power from battery 724 may continue to flow through activated soft start FET 720 and bypass diode 722 of switch 716 and through unit connect switch 714 to system voltage regulator 730 of the tablet unit 702 and system voltage regulator 728 of the base unit 704, as the FETs of switch 706 connecting tablet battery 726 to the system 700 are still deactivated.

Then, at step 606, a soft start FET of a tablet battery switch may be activated, to allow power from the tablet battery to flow through the tablet battery switch, if the voltage of the tablet battery is greater than the voltage of the base battery. For example, a controller of the tablet unit 702 may activate soft start FET 710 of switch 706. If the voltage of tablet battery 726 is greater than the voltage of base battery 724, power from tablet battery 726 may flow through soft start FET 710 and bypass diode 712 of switch 706 and unit connect switch 714 to system voltage regulator 730 of the tablet unit 702 and system voltage regulator 728 of the base unit 704. If voltage of base battery 724 is greater than voltage of tablet battery 726, power from base battery 724 may flow through soft start FET 720 and bypass diode 722 of switch 716 and through unit connect switch 714 to system voltage regulator 730 of the tablet unit 702 and system voltage regulator 728 of the base unit 704.

At step 608, a soft start FET of the base battery switch may be deactivated, completing the disconnection of the base battery from the information handling system. For example, a controller of the base unit 704 may deactivate soft start FET 720 of switch 716. Thus, power from tablet battery 726 may flow through soft start FET 710 and bypass diode 712 of switch 706 and unit connect switch 714 to system voltage regulator 730 of the tablet unit 702 and system voltage regulator 728 of the base unit 704.

At step 610, a block FET of the tablet battery switch may be activated, allowing current to flow through the block FET and the soft start FET, delivering power to the information handling system. For example, a controller of the tablet unit 702 may activate block FET 708, allowing power to flow from tablet battery 726 through soft start FET 710 and block FET 708 of switch 706 and unit connect switch 714 to system voltage regulator 730 of the tablet unit 702 and system voltage regulator 728 of the base unit 704. Thus, the transition from powering the information handling system with a battery in a base of the information handling system to powering the system with a battery in the tablet of the information handling system may be complete.

Figure 3:
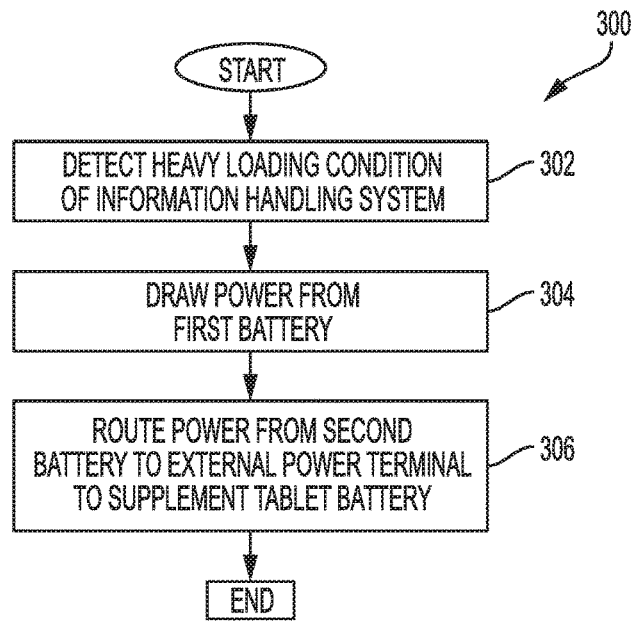
FIG. 3 is an example method for supplementing power from a first battery with power from a second battery when a heavy loading condition is detected in an information handling system according to some embodiments of the disclosure.

The schematic flow chart diagram of FIGS. 3, 4, and 6 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   detecting a heavy loading condition of an information handling system; and
   when the heavy loading condition is detected:
      drawing power from a first battery of the information handling system;
      routing power from a second battery of the information handling system to an external power input terminal of the information handling system to supplement power drawn by the information handling system from the first battery;
   detecting that the information handling system is no longer under the heavy loading condition;
   disconnecting power from the first battery to the information handling system after detecting the information handling system is no longer under the heavy loading condition; and
   rerouting power from the second battery to a battery input terminal of the information handling system after power from the first battery has been disconnected.

2. The method of claim 1, wherein routing comprises charging the first battery with power drawn from the second battery.

3. The method of claim 1, further comprising:
   disconnecting power from the second battery to the information handling system after detecting that the information handling system is no longer under the heavy loading condition.

4. An information handling system, comprising:
   a first unit, comprising:
      a display,
      a first external power input terminal,
      a first battery input terminal,
      a first battery, and
   a second unit, comprising:
      an input device,
      a second battery, and
   a controller, wherein the controller is configured to perform steps comprising:
      detecting a heavy load condition on the first unit; and
      when the heavy load condition is detected:
         drawing power from the first battery of the first unit; and
         routing power from the second battery of the second unit through the first external power input terminal of the first unit to supplement the power drawn from the first battery of the first unit;
      detecting that the first unit is no longer under the heavy loading condition;
      disconnecting power from the first battery to the first unit after detecting the first unit is no longer under the heavy loading condition; and
      rerouting power from the second battery to the first battery input terminal of the first unit after power from the first battery has been disconnected.

5. The information handling system of claim 4, wherein the first external power input terminal is external to a voltage domain of the first battery.

6. The information handling system of claim 4, wherein the controller comprises a first controller, housed in the first unit, and a second controller, housed in the second unit, and wherein the first controller and the second controller communicate with each other to coordinate power routing between the first unit and the second unit.

7. The information handling system of claim 4, wherein the first unit is a tablet and the second unit is a base.

8. The information handling system of claim 4, wherein the step of routing comprises charging the first battery with power drawn from the second battery.

9. The information handling system of claim 4, wherein the controller is further configured to perform steps comprising rerouting power from the second battery to the first battery input terminal of the first unit after power from the first battery has been disconnected.

10. The information handling system of claim 4, wherein the controller is further configured to perform steps further comprising:
disconnecting power from the second battery to the first unit after detecting that the first unit is no longer under the heavy loading condition.

11. The information handling system of claim 4, wherein the first external power input terminal comprises an input of a narrow voltage direct current charger (NVDC).

12. A base unit of an information handling system, comprising:
an input device;
a first battery;
a first power terminal to connect the base unit to an external power input terminal of a tablet unit of the information handling system;
a second power terminal to connect the base unit to a battery power terminal of the tablet unit of the information handling system;
a first switch connected between the first battery and the first power terminal, wherein the first switch comprises a first Field Effect Transistor (FET), a second FET, and a first bypass diode connected in parallel to the first FET;
a second switch connected between the first battery and the second power terminal, wherein the second switch comprises a third Field Effect Transistor (FET), a fourth FET, and a second bypass diode connected in parallel to the third FET; and
a controller, wherein the controller is configured to control the first switch and the second switch to supply power from the first battery to the tablet unit of the information handling system through either the first power terminal or the second power terminal, wherein the controller is configured to perform steps comprising:
detecting a transition condition for the first battery;
de-activating the fourth FET of the second switch;
activating the first FET of the first switch;
de-activating the third FET of the second switch; and
activating the second FET of the first switch.

13. The base unit of claim 12, wherein the external power input terminal is external to a voltage domain of the first battery.

14. The base unit of claim 12, wherein the controller is configured to control the first switch to deliver power from the first battery through the first power terminal to the external power input terminal of the tablet unit, to supplement power drawn from a second battery of the tablet unit.

15. The base unit of claim 12, wherein the second switch is configured to allow current to flow through the second switch during a transition from powering the system with the first battery of the base unit to a second battery of the tablet unit, if a voltage of the first battery of the base unit is greater than a voltage of the second battery of the tablet unit.

16. The base unit of claim 12, wherein the controller is configured to deactivate the first switch and the second switch when the information handling system is being powered by a second battery of the tablet unit.

* * * * *